United States Patent
Enzmann

(10) Patent No.: US 8,712,416 B2
(45) Date of Patent: *Apr. 29, 2014

(54) METHOD AND APPARATUS FOR PROVIDING SEAMLESS CALL HANDOFF BETWEEN NETWORKS THAT USE DISSIMILAR TRANSMISSION METHODS

(75) Inventor: Mark J. Enzmann, Blairsville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 14 days.

This patent is subject to a terminal disclaimer.

(21) Appl. No.: 13/308,374

(22) Filed: Nov. 30, 2011

(65) Prior Publication Data

US 2012/0071166 A1   Mar. 22, 2012

Related U.S. Application Data

(63) Continuation of application No. 12/853,962, filed on Aug. 10, 2010, now Pat. No. 8,095,135, which is a continuation of application No. 10/742,153, filed on Dec. 19, 2003, now Pat. No. 7,801,529.

(51) Int. Cl.
   *H04W 4/00*   (2009.01)

(52) U.S. Cl.
   USPC ........... 455/436; 455/437; 455/438; 455/439; 455/440; 455/441; 455/442; 455/443; 455/44; 455/334; 370/331; 370/332; 370/333; 370/334

(58) Field of Classification Search
   USPC ......... 455/436, 437, 438, 439, 440, 441, 442, 455/443, 444; 370/331, 332, 333, 334
   See application file for complete search history.

(56) References Cited

U.S. PATENT DOCUMENTS

| | | | |
|---|---|---|---|
| 6,904,029 B2 | 6/2005 | Fors et al. | |
| 7,009,952 B1 | 3/2006 | Razavilar et al. | |
| 2003/0134638 A1 | 7/2003 | Sundar et al. | |
| 2003/0193910 A1* | 10/2003 | Shoaib et al. | 370/331 |
| 2004/0042444 A1* | 3/2004 | Edmon et al. | 370/352 |

(Continued)

OTHER PUBLICATIONS

U.S. Office Action dated Dec. 8, 2010 in U.S. Appl. No. 12/853,962.

(Continued)

*Primary Examiner* — German J Viana Di Prisco
(74) *Attorney, Agent, or Firm* — Hartman & Citrin LLC

(57) ABSTRACT

Call handoff from an 802.1x network to a cellular network, and vice versa. A wireless device that has both cellular and 802.1x capability detects the strength of a cellular signal and of an 802.1x signal. If a call is taking place over the 802.1x network and the strength of the 802.1x signal drops below a particular level and the strength of the cellular signal is above a certain level, the call is handed off from the 802.1x network to the cellular network. If a call is taking place over the cellular network and the cellular signal strength drops below a certain level while the 802.1x signal strength is above a certain level, the call is handed off from the cellular network to the 802.1x network. In addition, the user of the wireless device can manually initiate the handoff by actuating a handoff selector of the wireless device.

20 Claims, 8 Drawing Sheets

(56) References Cited

U.S. PATENT DOCUMENTS

| | | | |
|---|---|---|---|
| 2004/0087305 A1 | 5/2004 | Jiang et al. | |
| 2004/0105434 A1 | 6/2004 | Baw | |
| 2004/0127208 A1 | 7/2004 | Nair et al. | |
| 2004/0192294 A1* | 9/2004 | Pan et al. | 455/432.1 |
| 2005/0047435 A1* | 3/2005 | Segal et al. | 370/466 |
| 2005/0059400 A1* | 3/2005 | Jagadeesan et al. | 455/436 |
| 2005/0070288 A1 | 3/2005 | Belkin et al. | |
| 2005/0083874 A1 | 4/2005 | Guo et al. | |
| 2005/0090259 A1 | 4/2005 | Jain et al. | |
| 2005/0130650 A1* | 6/2005 | Creamer et al. | 455/432.1 |

OTHER PUBLICATIONS

U.S. Office Action dated May 24, 2011 in U.S. Appl. No. 12/853,962.

U.S. Notice of Allowance dated Sep. 2, 2011 in U.S. Appl. No. 12/853,962.

U.S. Office Action dated Sep. 22, 2005 in U.S. Appl. No. 10/742,153.

U.S. Office Action dated Apr. 17, 2006 in U.S. Appl. No. 10/742,153.

U.S. Office Action dated Mar. 8, 2007 in U.S. Appl. No. 10/742,153.

U.S. Office Action dated Aug. 27, 2007 in U.S. Appl. No. 10/742,153.

U.S. Office Action dated Mar. 11, 2008 in U.S. Appl. No. 10/742,153.

U.S. Office Action dated Dec. 8, 2008 in U.S. Appl. No. 10/742,153.

U.S. Office Action dated May 21, 2009 in U.S. Appl. No. 10/742,153.

U.S. Office Action dated Oct. 29, 2009 in U.S. Appl. No. 10/742,153.

U.S. Notice of Allowance dated May 17, 2010 in U.S. Appl. No. 10/742,153.

* cited by examiner

METHOD AND APPARATUS FOR PROVIDING SEAMLESS CALL HANDOFF BETWEEN NETWORKS THAT USE DISSIMILAR TRANSMISSION METHODS

This application is a continuation of U.S. patent application Ser. No. 12/853,962, filed Aug. 10, 2010, now U.S. Pat. No. 8,095,135; which is a continuation of U.S. patent application Ser. No. 10/742,153, filed Dec. 19, 2003, now U.S. Pat. No. 7,801,529, the contents of which are hereby incorporated by reference herein in their entirety into this disclosure.

BACKGROUND OF THE INVENTION

1. Field of the Invention

The present invention relates to wireless communications and, more particularly, to seamlessly handing off a call from one wireless network that uses a particular transmission method to a different wireless network that uses a different transmission method.

2. Description of Related Art

Devices are available that have both cellular capability and capability to perform under the standard of the Institute of Electrical and Electronics Engineering (IEEE) known as the IEEE 802.1x standard. Such devices include, for example, laptop computers and personal digital assistants (PDAs). Cellular networks use transmission methods that are different from the transmission methods used in 802.1x networks. The transmission methods used by cellular networks are governed by standards such as WCDMA, GPRS, 1XRT, 3XRT and EDGE, for example. The transmission methods used by 802.1x networks are governed by the applicable IEEE 802.1x standard. The term 802.1x, as that term is used herein, means all of the IEEE standards that have the prefix 802.1, including, but not limited to, 802.11, 802.11a, 802.11b, 802.11c, 802.11d, 802.11e, 802.11f, 802.11g, 802.11h, 802.11i, etc. 802.1x networks use the Transport Control Protocol/Internet Protocol (TCP/IP) to enable wireless devices with 802.1x capabilities to wirelessly connect to access points of wired and wireless local area networks (LANs). Voice, data, video and audio are transmitted over 802.1x networks in TCP/IP packets.

An 802.1x network access point has a limited distance over which it can communicate with a wireless device. When the 802.1x device moves out of range of the access point, the call is dropped. The call may be communicating voice, data, video or audio at the time it is dropped. There may be times when an 802.1x-capable device, such as a PDA, for example, is out of range of a 802.1x access point, but within range of a cellular base station transmitter. However, even though devices exist that have both cellular and 802.1x capabilities, such devices do not have the capability to seamlessly switch from communicating over an 802.1x network to communicating over a cellular network, or vice versa. Therefore, the user is faced with having to manually establish communication with the cellular network after the call has been dropped. Of course, resuming a call in this manner may result in information being lost, regardless of whether voice, data, video or audio is being communicated. An analogous situation occurs when a device moves out of range of a cellular network and within range of an access point of an 802.1x network.

It would be desirable to provide the capability of performing a seamless handoff of a call from an 802.1x network to a cellular network, and vice versa.

SUMMARY OF THE INVENTION

The present invention provides for seamless call handoff from an 802.1x network to a cellular network. The wireless device of the present invention has both cellular and 802.1x capability. In order for handoffs to occur automatically and seamlessly, signal strength detection circuitry in the wireless device detects the strength of a cellular signal being transmitted by a cellular network and of an 802.1x signal being transmitted from an access point of an 802.1x network. If a call is taking place over the 802.1x network and the strength of the 802.1x network signal drops below a particular level while the strength of the cellular signal is above a certain level, the call is handed off from the 802.1x network to the cellular network. The wireless device preferably also comprises a handoff selector that allows the user to manually initiate a handoff and to manually override a handoff.

In accordance with the preferred embodiment, not only is it possible to perform a seamless handoff from an 802.1x network to a cellular network, but also from a cellular network to an 802.1x network. In accordance with the preferred embodiment, seamless handoffs occur in both directions. If a call is taking place over the cellular network and the cellular signal strength drops below a certain level while the 802.1x signal strength is above a certain level, the call is handed off from the cellular network to the 802.1x network. If a call is taking place over the 802.1x network and the strength of the 802.1x network signal drops below a particular level while the strength of the cellular signal is above a certain level, the call is handed off from the 802.1x network to the cellular network.

In accordance with the preferred embodiment, when a call is to be handed off from the 802.1x network to the cellular network (i.e., when the strength of the signal from available access points has dropped below a certain level), the wireless device queries the cellular network for signaling and IP connectivity information. When the wireless device receives this information, the wireless device communicates it to the SIP or equivalent server of the 802.1x service providing network. The server communicates with the media gateway to set up the new connection between the terminating station and the wireless device over the cellular network connection. When communication between the media gateway and the cellular carrier is given preference, the call on the 802.1x network may be terminated. This termination occurs after the "voice" path has been established and determined to be stable.

When a call is to be handed off from the cellular network to the 802.1x network, the wireless device queries the 802.1x network for signaling and IP connectivity information. When the wireless device receives this information, the wireless device communicates it to the call control server (e.g., an SIP or equivalent server) of the service providing network. The call control server communicates with the media gateway to set up the call on the 802.1x network with the new connection between the terminating station and the wireless device over the 802.1x network.

DETAILED DESCRIPTION OF THE EXEMPLARY EMBODIMENTS

Figure 1:
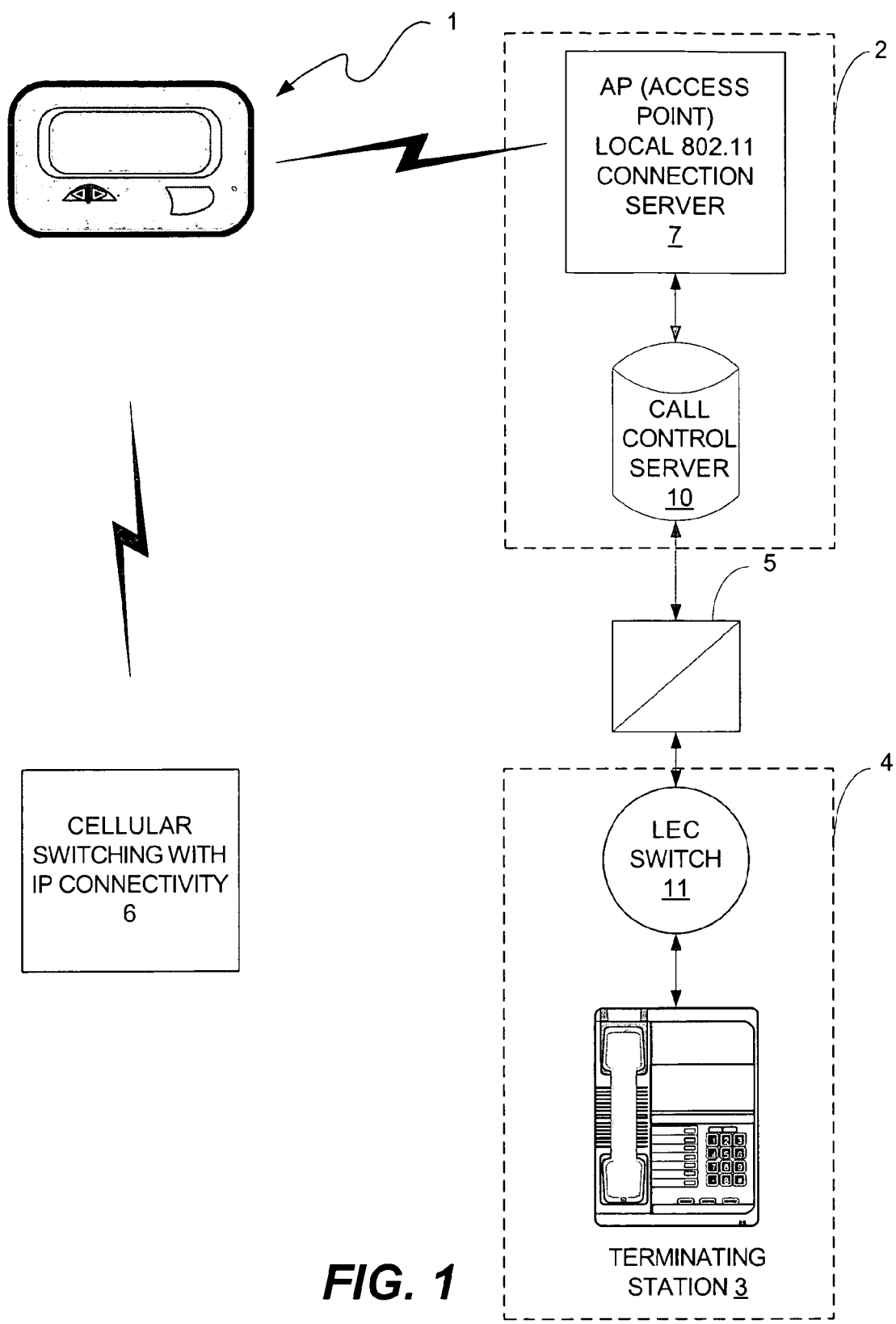
FIG. 1 is a block diagram showing the connectivity between a wireless device and an 802.1x network when a call is established between the wireless device and a terminating station that is connected to the 802.1x network via a Plain Old Telephone Service (POTS) network, also commonly known as Public Switched Telephone Network (PSTN), and a media gateway.

FIG. 1 is a diagram of an 802.1x network that illustrates connections made over the 802.1x network when a call from a wireless device 1 is being serviced by the 802.1x network 2. In the example shown, the wireless device 1 is a PDA that initiates a call to a terminating station 3 of a plain old telephone service (POTS) network 4. The wireless device 1 could be any type of wireless device. A media gateway 5 provides the necessary connectivity between the 802.1x network 2 and the POTS network 4. The terminating station 3 is shown as being a telephone in this example, although it could be any type of terminating device. Also, although the call is shown in this example as terminating at a POTS terminating station 3, the call could instead terminate at a wireless device (not shown) in communication with a cellular network, such as cellular network 6, for example, having cellular switching with Internet Protocol (IP) connectivity.

The media gateway 5 also interfaces the cellular network 6 with the 802.1x network 2. It should also be noted that the call could be initiated by a wireless device communicating over the cellular network 6, in which case the media gateway would route the call over the 802.1x network 2 to the wireless device 1. Similarly, the call could be initiated by the terminating station 3 and directed to the wireless device 1, in which case the media gateway 5 would route the call from the POTS network 4 to the wireless device over the 802.1x network 2. The present invention is equally applicable to each of these scenarios, as described below in more detail.

In accordance with the present invention, the wireless device 1 has both cellular and 802.1x capabilities. The wireless device 1 also has intelligence that enables it to sense the strength of the signal between the wireless device 1 and the access point 7 of the 802.1x network 2 and the strength of the signal between the wireless device 1 and the cellular network 6. In accordance with the preferred embodiment, when the wireless device 1 is communicating over the 802.1x network 2 (i.e., the 802.1x network 2 is servicing the call), it is also querying the cellular network 6 so that it can measure the strength of the response to the query from the cellular network 6. Simultaneously, while the wireless device 1 is communicating with the access point 7, it is also measuring the strength of the signal received from the access point 7. When the strength of the signal received from the access point 7 drops below a certain level and the strength of the signal received from cellular network 6 is above a certain level, the call is handed off from the 802.1x network 2 to the cellular network 6. Once the call is being serviced by the cellular network 6, the connection between the wireless device 1 and the 802.1x network 2 preferably is severed.

Similarly, when the wireless device 1 is communicating over the cellular network 6 (i.e., the cellular network 6 is servicing the call), it is also querying the 802.1x network 2 so that it can measure the signal strength of the response to the query from the access point 7. Simultaneously, while the wireless device 1 is communicating with the cellular network 6, it is also measuring the strength of the signal received from the cellular network 6. When the strength of the signal received from the cellular network 6 drops below a certain level and the strength of the signal received from access point 7 is above a certain level, the call is handed off from the cellular network 6 to the 802.1x network 2. Once the call is being serviced by the 802.1x network 2, the connection with the cellular network 6 preferably is severed. The term "severed", as that term is used herein, means that the resources that were being used to handle the call prior to the handoff are released.

Because the call is not severed until the new connection is established, no information is lost and there is no discontinuity with the call, regardless of whether voice, data, video or audio is being transmitted. A call control (e.g., session initiation protocol (SIP)) server 10 of the network 2 handles call signaling, call routing, capabilities exchange, media control and supplementary services. As an alternative to a SIP server, an equivalent type of server could be used, such as, for example, an H.323 server. When the wireless device 1 initiates a call to the 802.1x network 2, the access point 7 communicates information to the server 10 that the server 10 records, including the IP address of the wireless device 1, the "IP" address of the terminating station 3, the connect time of the wireless device 1 and the ID of the wireless device 1. The connect time is recorded for billing purposes and the IP address of the wireless device 1 that originates the call, the "IP" address of the terminating station 3 and the ID of the wireless device 1 are needed for call signaling and call routing. The server 10 then communicates information to the media gateway 5 that allows the media gateway 5 to make the connection between the IP address of the wireless device 1 and the IP address of the local exchange switch 11 that corresponds to the terminating station 3.

At the local exchange switch 11, the IP address associated with the terminating station 3 is converted into a physical POTS address and a physical connection is made between the terminating station 3 and the local exchange switch 11. The media gateway 5 comprises intelligence for converting the signals from the TCP/IP addressing format into signals conditioned for the POTS network 4, and vice versa.

Figure 2:
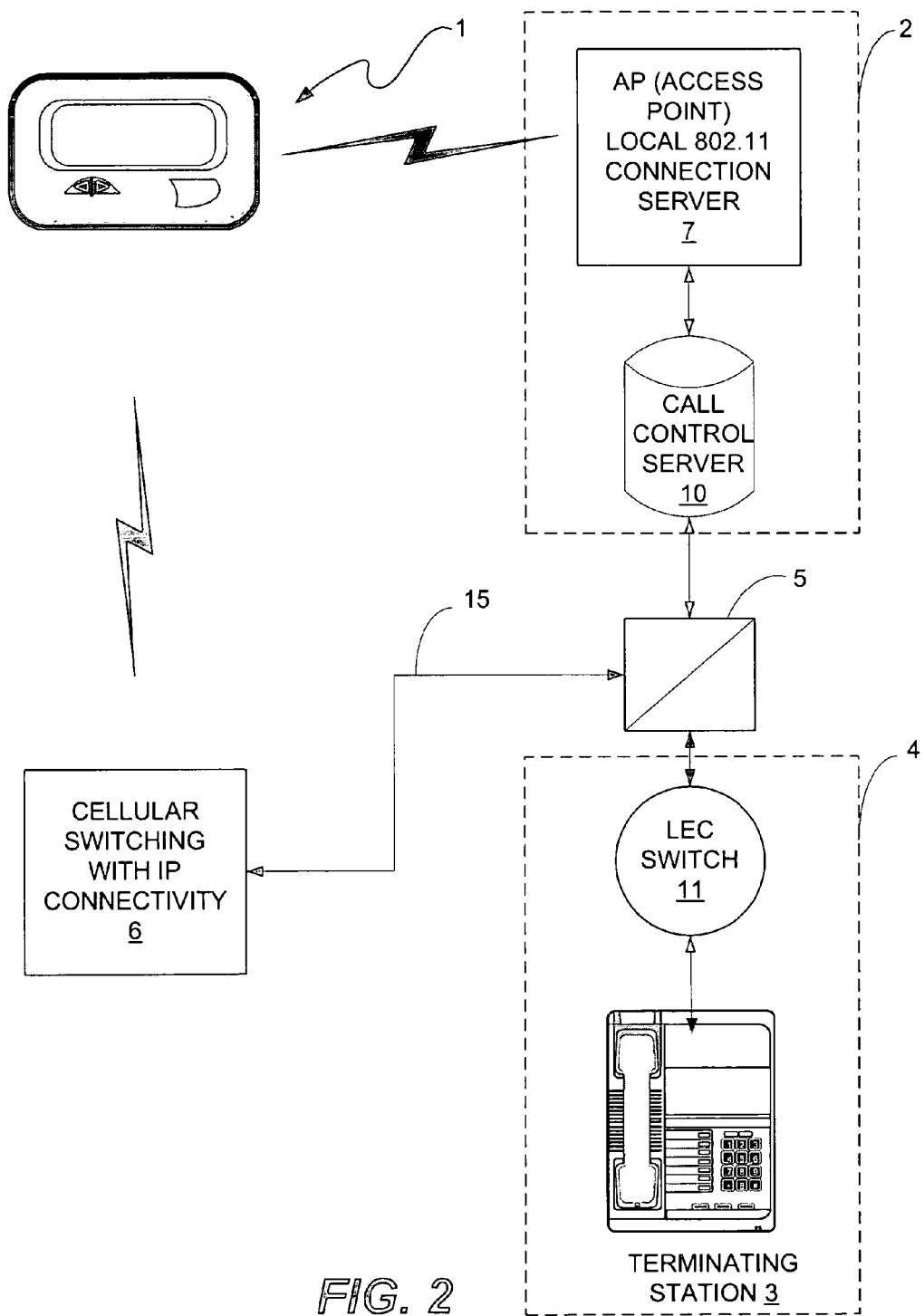
FIG. 2 is a block diagram showing the connectivity between a wireless device and a cellular network when a call that was initially established over the 802.1x network is handed off to the cellular network to maintain a connection between a wireless device and the terminating station that is connected to the cellular network via a POTS network and a media gateway.

FIG. 2 is identical to FIG. 1 except that it shows a connection 15 between the cellular network 6 and the media gateway 5 to represent the wireless device 1 communicating with the terminating station 3 when the media gateway 5 receives the IP connectivity information sent from the cellular network 6 and transmitted by the wireless device 1 to the access point 7 and makes the new connection. The wireless device 1 preferably consistently takes samples of ambient signals available in the spectrum (i.e., the access point transmissions). When the wireless device 1 determines that the strength of the signal received from the access point 7 has dropped below a certain level and that the strength of the signal received from the cellular network 6 is at or above a certain level, the wireless device 1 queries the cellular network 6 to obtain the signaling and IP connectivity information needed for the handoff from the 802.1x network 2 to the cellular network 6. The wireless device 1 will first recognize an available signaling network, and then attempt to access data service (e.g., GPRS, EDGE, 1XRT, etc.). If these fail, another network will be interrogated. This does not widely vary from current cellular attachment to data networks.

The wireless device 1 communicates the signaling and IP connectivity information to the access point 7, which communicates the information to the SIP or equivalent (e.g., H.323) call control server 10. The server 10 records this information, which includes the IP address that the cellular network 6 has assigned to the wireless device 1 for it to use in the handoff. The server 10 changes the IP address of the wireless device 1 from the one that was recorded when the call was initiated to the new IP address assigned by the cellular network 6. The server 10 then provides the media gateway 5 with the new IP address of the wireless device 1 on the cellular network 6, thereby causing the new communication link between the wireless device 1 connected to the cellular network 6 and the terminating station 3 connected to the POTS network 4 to be established. Once the new connection is established, the server 10 causes the access point 7 to sever its wireless connection with the wireless device 1. Alternatively, the wireless device 1, rather than the server 10, will terminate the 802.1x connection and release the resources. Because, the original connection is not severed until after the new connection has been established, the handoff is seamless. The line 15 from the cellular network 6 to the media gateway 5 represents the new connection.

Figure 3A:
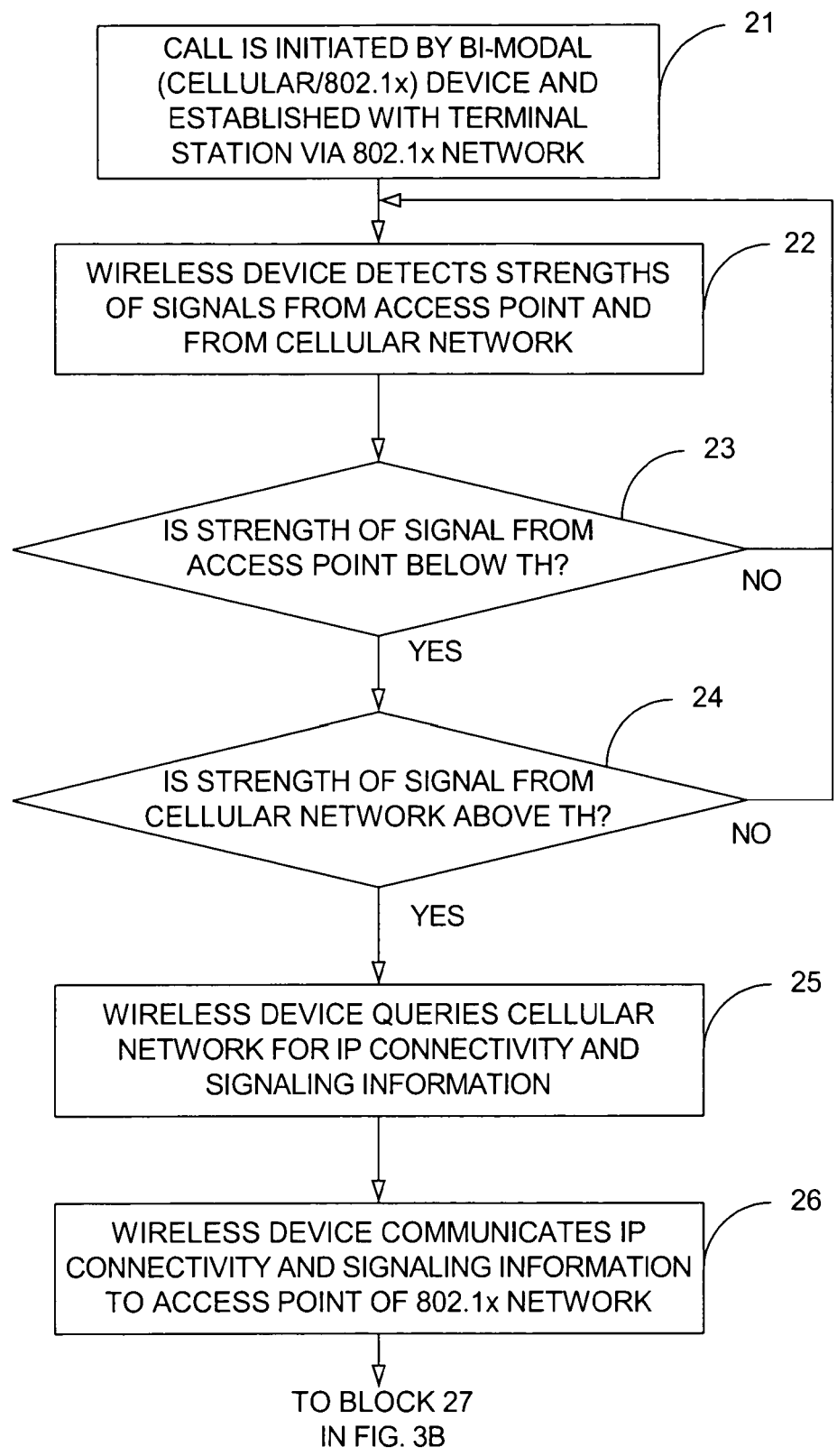
FIGS. 3A and 3B together illustrate a flow chart of the method of the present invention in accordance with a preferred embodiment for seamlessly handing off a wireless device call from an 802.1x network to a cellular network.
Figure 3B:
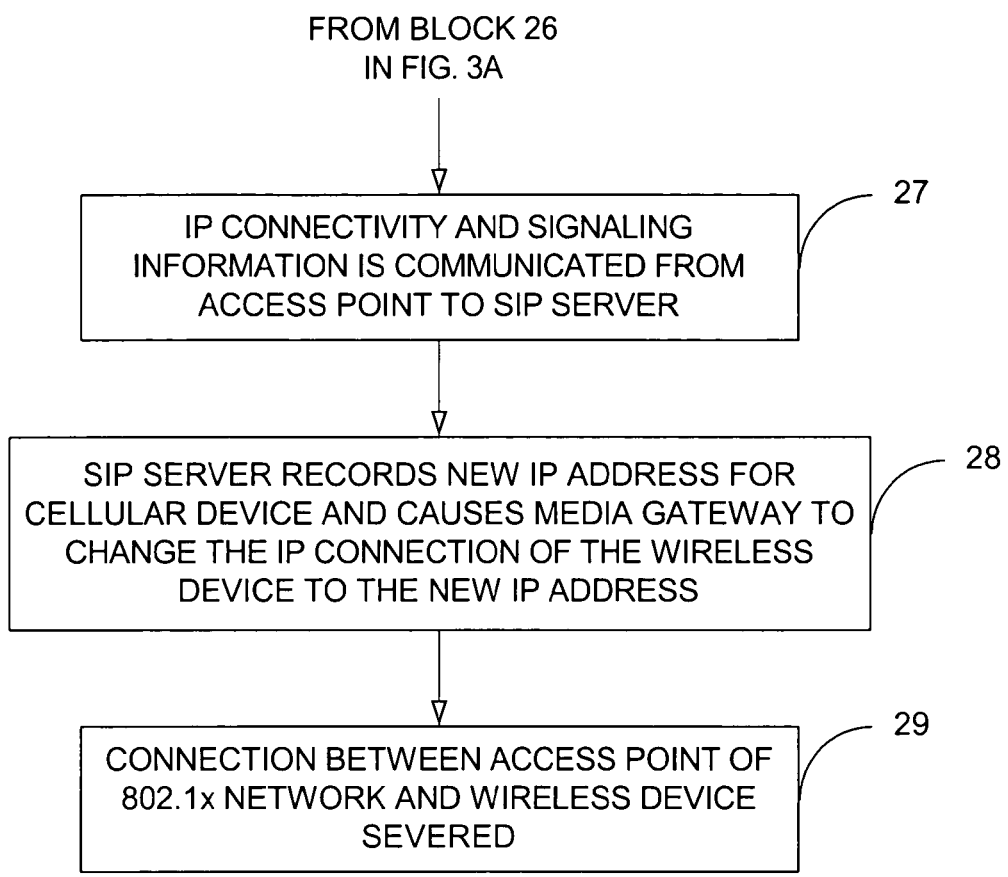

FIGS. 3A and 3B illustrate a flow chart of the method of the present invention in accordance with the preferred embodiment for performing a seamless handoff from the 802.1x network 2 to the cellular network 6. The call is initiated by the wireless device 1 and established between the wireless device 1 and the terminating station 3, as indicated by block 21. While the call is being service by the 802.1x network 2, the strengths of the signals from the access point 7 and from the cellular network 6 are detected by the wireless device 1, as indicated by block 22. A determination is made as to whether the strength of the signal from the access point 7 has dropped below a certain threshold level, as indicated by decision block 23. If so, a determination is made as to whether the strength of the signal from the cellular network is at or above a certain threshold level, as indicated by decision block 24. If the answer to either of these questions is no, the process returns to block 22. The order in which steps 23 and 24 are performed can be reversed.

If the answer to both of the questions of blocks 22 and 23 is yes, then the wireless device 1 queries the cellular network 6 for signal and IP connectivity information, as indicated by block 25. The wireless device 1 receives the signal and IP connectivity information from the cellular network 6 and communicates it to the access point 7, as indicated by block 26. The access point 7 communicates the information, which includes the new IP address that will be used for the wireless device 1, to the SIP server 10, as indicated by block 27 in FIG. 3B. The SIP server 10 then records the new IP address of the wireless device 1 and causes the media gateway 5 to establish the new connection, as indicated by block 28. The access point 7 then severs the connection with the wireless device 2, as indicated by block 29. The step represented by block 29 is optional, but preferred.

Figure 4A:
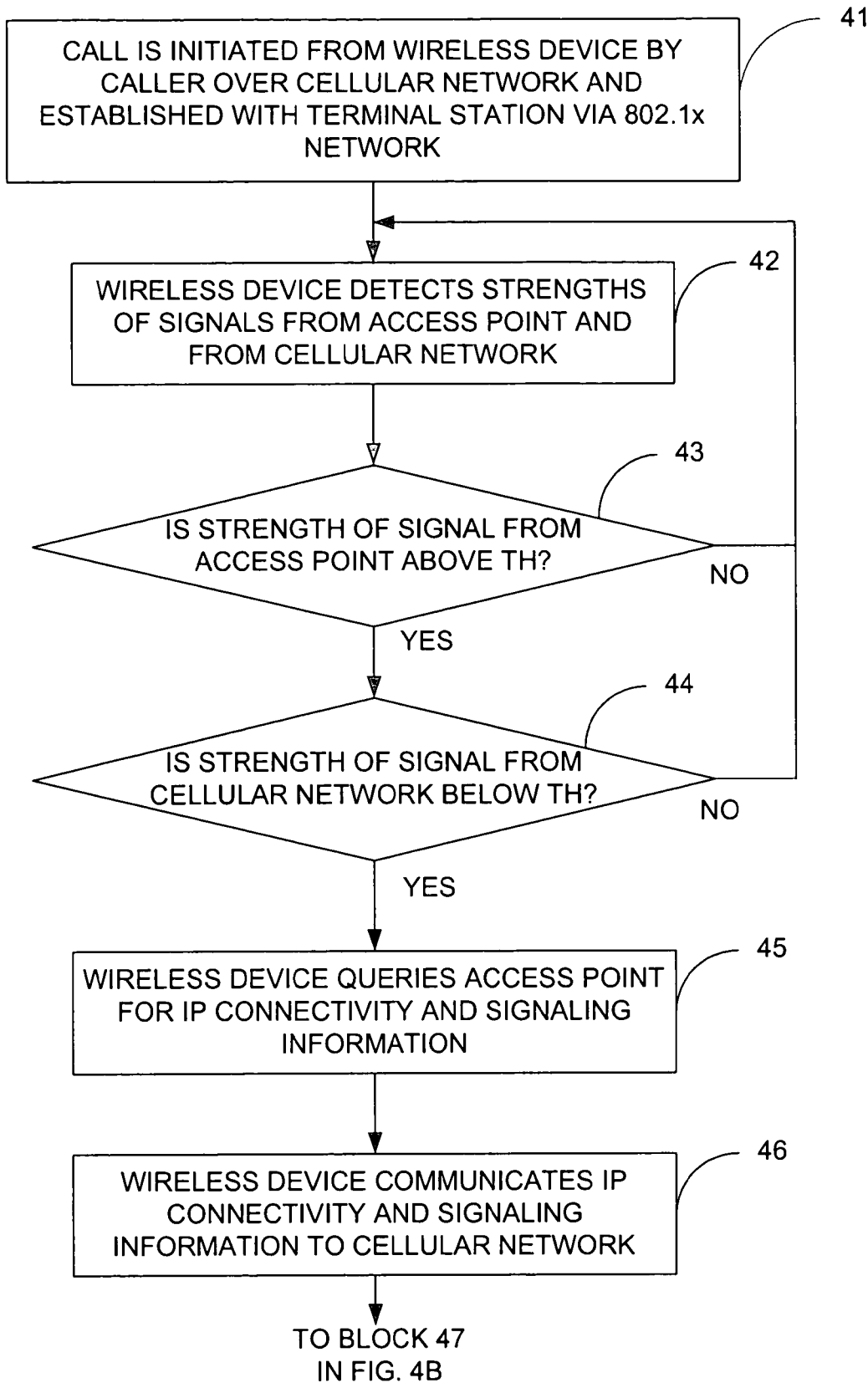
FIGS. 4A and 4B together illustrate a flow chart of the method of the present invention in accordance with a preferred embodiment for seamlessly handing off a wireless device call from a cellular network to an 802.1x network.
Figure 4B:
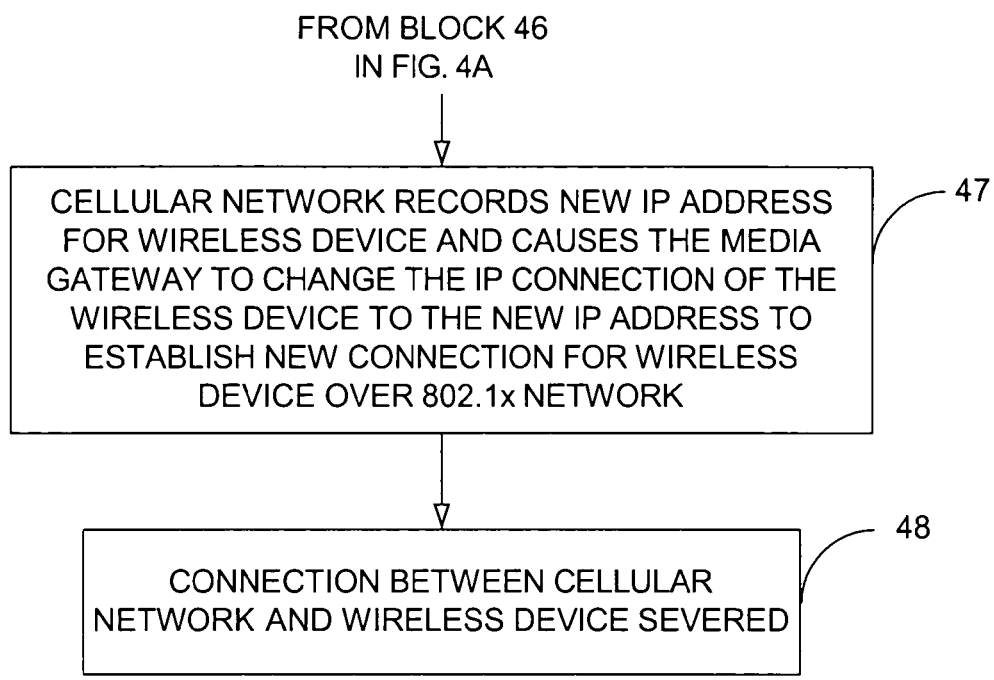

FIGS. 4A and 4B illustrate a flow chart of the method of the present invention in accordance with the preferred embodiment for performing a seamless handoff from the cellular network 6 to the 802.1x network 2. The method is very similar to the method for performing the handoff from the 802.1x network 2 to the cellular network 6. The call is initiated by the wireless device 1 on the cellular network 6 and established between the wireless device 1 and the terminating station 3 via the media gateway 5 and the LEO switch 11, as indicated by block 41. While the call is in progress, the strength of the signals from the access point 7 and from the cellular network 6 is measured by the wireless device, as indicated by block 42. A determination is made as to whether the strength of the signal from the cellular network 6 has dropped below a certain threshold level, as indicated by decision block 43. If so, a determination is made as to whether the strength of the signal from the 802.1x network 2 is at or above a certain threshold level, as indicated by decision block 44. If the answer to either of these questions is no, the process returns to block 42. As with blocks 23 and 24, the steps represented by blocks 43 and 44 can be reversed.

If the answer to both of these questions is yes, then the wireless device 1 queries the access point 7 for signal and IP connectivity information, as indicated by block 45. The wireless device 1 receives the signal and IP connectivity information from the access point 7 and communicates it to the cellular network 6, as indicated by block 46. The cellular network 6 communicates the new IP address of the wireless device 1 to the media gateway 5, which establishes the new IP connection for the wireless device 1 on the 802.1x network 2, as indicated by block 47. The connection between the cellular network 6 and the wireless device 1 preferably is then severed, as indicated by block 48.

As stated above, the wireless device 1 preferably also comprises a handoff selector switch that allows the user to initiate the handoff and to override a handoff. In some cases, the detected strength levels of the signals from both the cellular network 6 and the 802.1x network 2 may be sufficiently high to enable the call to be handled by either network. The user may desire, for one or more of a variety of reasons (e.g., technology, speed, convenience, money, etc.), to switch from communicating over one of these networks to communicating over the other. To accomplish this, the user actuates the handoff selector switch, which causes the operations represented by blocks 25-29 or 45-48 in FIGS. 3A-4B to occur. The selector switch may be any type of input device that enables a user to make a selection. For example, the selection could be made by depressing a key on a keypad, by highlighting and selecting an item in a menu, etc.

The selector switch may also be used to override an impending handoff. For example, if an automatic handoff from the 802.1x network 2 to the cellular network 6 is impending due to the fact that the threshold conditions in blocks 23 and 24 of FIG. 3A have been met, the handoff will be prevented if the selector switch has been activated. This is useful where the user wishes to continue communicating over the 802.1x network 2 rather than switch to communicating over the cellular network 6.

Figure 5:
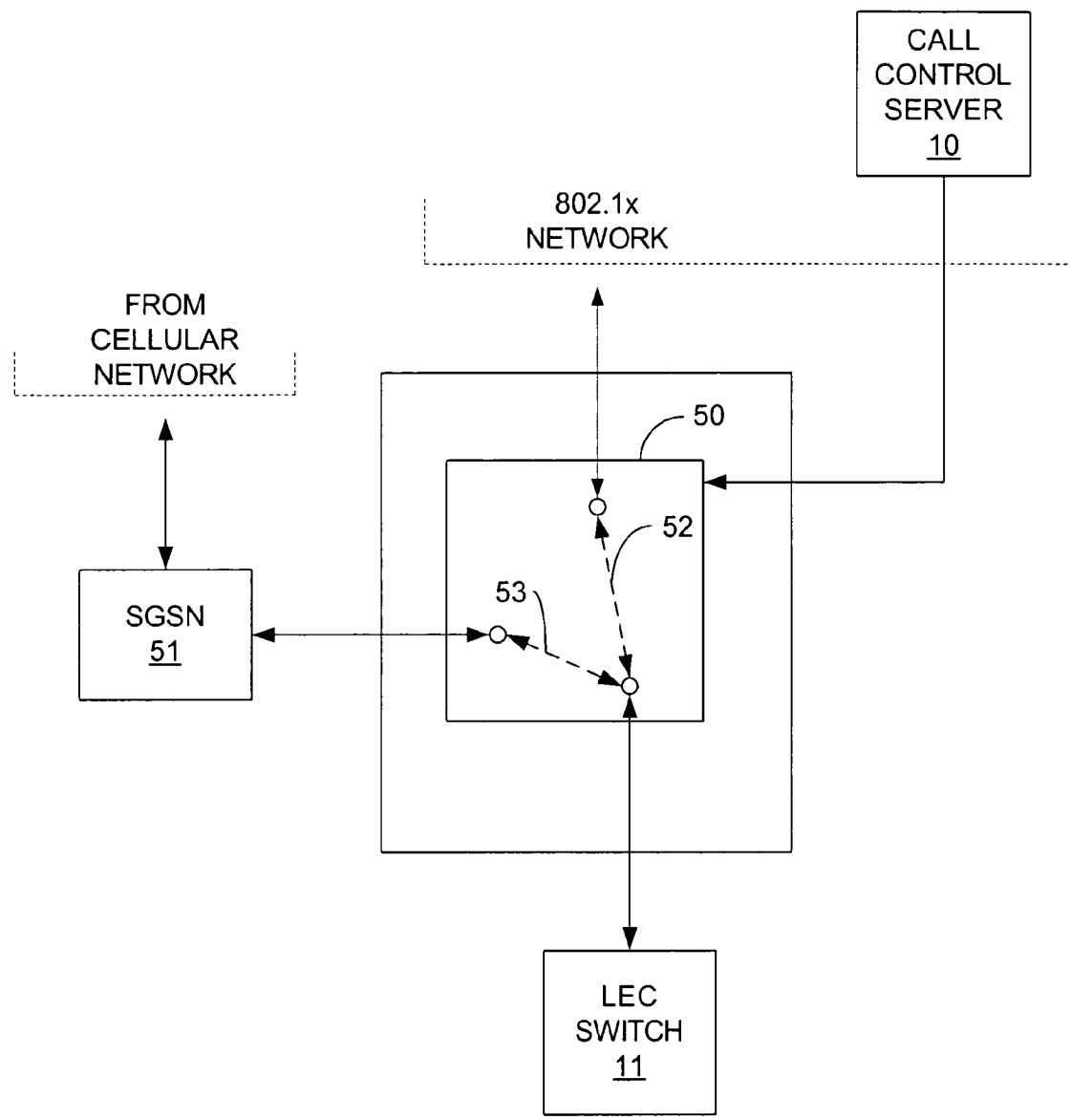
FIG. 5 is a block diagram of a media gateway connected to a cellular network and to an 802.1x network.
Figure 6:
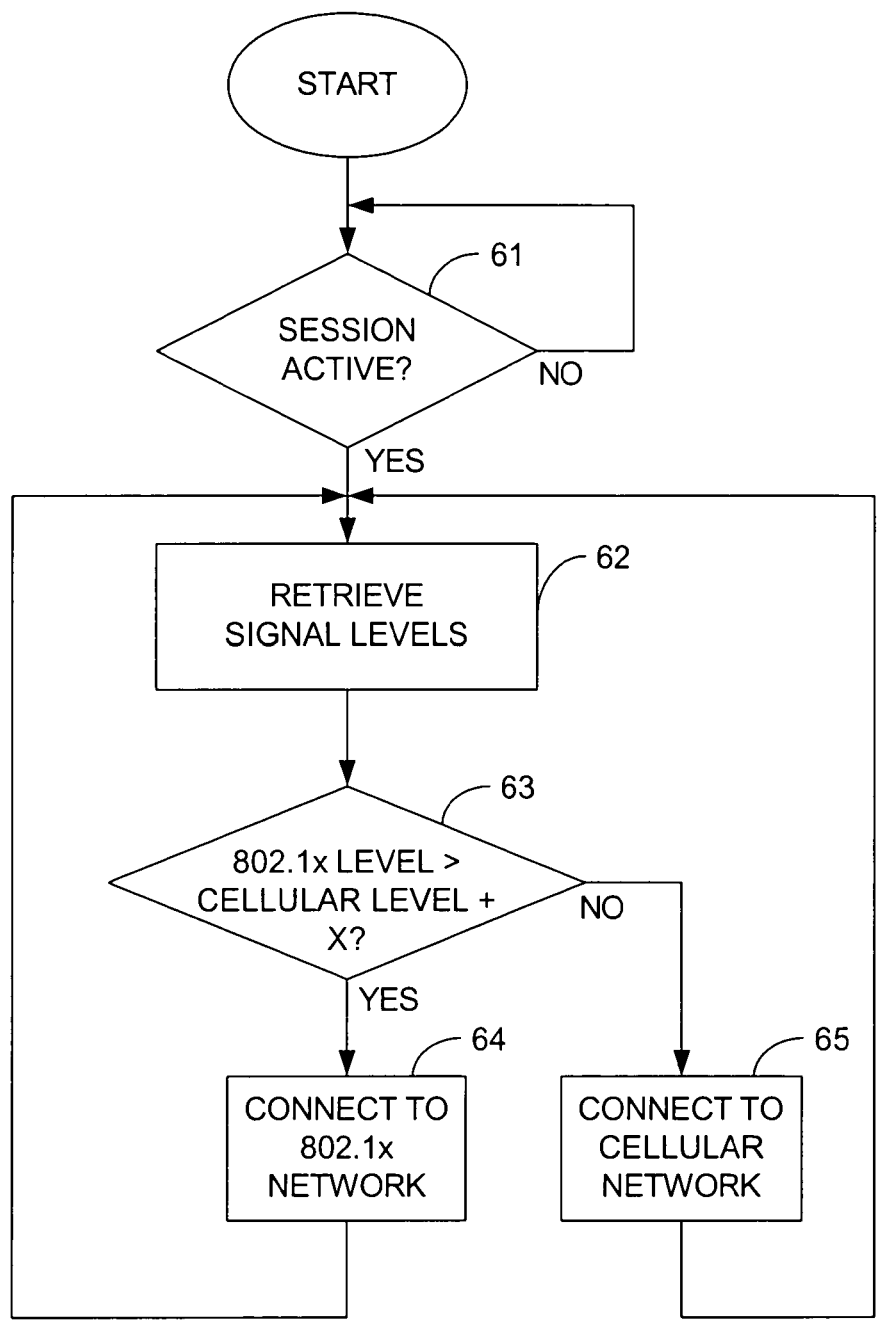
FIG. 6 is a flow chart illustrating an embodiment of the method performed by the call control server shown in FIG. 2 to cause a call handoff from an 802.1x network to a cellular network to occur, and vice versa.

FIG. 5 is a block diagram of the media gateway 5 shown in FIG. 1. The switching logic in the media gateway 5 that enables the call session to be switched from the 802.1x network 2 to the cellular network 6, and vice versa, is represented by the box labeled 50. The gateway 5 is shown as being interfaced with the call control server 10 and with the LEO switch 11 shown in FIG. 1. As indicated above, the call control server 10 is part of the 802.1x network 2 and the LEO switch 11 is part of the POTS network 4. The cellular network 6 interfaces to the gateway 5 via a serving GPRS support node (SGSN) 51, which provides the IP interface between the cellular network 6 and the gateway 5. The dashed arrows 52 and 53 in block 50 represent the connections in the gateway 5 that are switched when a handoff occurs. When a call is handed off from the 802.1x network 2 to the cellular network 6, connection 53 is made and connection 52 is eliminated. When a call is handed off from the cellular network 6 to the 802.1x network 2, connection 52 is made and connection 53 is eliminated. FIG. 6 is a flow chart illustrating an embodiment of the method performed by the call control server 10 in conjunction with the media gateway 5 to enable handoffs to occur.

The server 10 determines whether or not a call session is active, as indicated by block 61. Until a session is active, a handoff cannot occur. Once a determination is made that a session is active, the process proceeds to block 62 and the server 10 retrieves both the cellular and 802.1x signal levels. A determination is then made at block 63 as to whether the 802.1x signal level exceeds the cellular level plus an amount "X". The value of X can be 0 or any other value, positive or negative. When a determination is made at block 63 that the 802.1x signal level exceeds the cellular level plus X, the call control server 10 causes the media gateway 5 to switch the call from connection 53 to connection 52 unless connection 52 already exists, as indicated by block 64. If connection 52 already exists, no handoff needs to occur, and so connection 52 will continue to be maintained. If connection 52 does not yet exist because the call is currently being handled by the cellular network, connection 52 will be made and connection 53 will be eliminated to free up the resources that were being used for the call over the cellular network.

If a determination is made at block 63 that the 802.1x signal level does not exceed the cellular signal level plus X, the call control server 10 causes the media gateway 5 to switch the call from connection 52 to connection 53 unless connection 53 already exists, as indicated by block 65. If connection 53 already exists because the call is currently being handled by the cellular network, no handoff needs to occur. In that case, connection 53 will continue to be maintained. If connection 53 does not yet exist because the call is currently being handled by the 802.1x network, connection 53 will be made and connection 52 will be eliminated to free resources that were being used to service the call over the 802.1x network.

In an embodiment, the value of X can be altered manually by activating the aforementioned selector switch. For example, activation of the selector switch could cause the value of X to increase to prevent the condition in block 63 from being true, which would prevent a handoff from the cellular network to the 802.1x network from occurring. If the cellular network is currently handling the call, the cellular network will continue to handle the call. Alternatively, actuation of the selector switch could cause the value of X to decrease or become negative, thereby ensuring that the condition of block 63 is true. This would ensure that a handoff from the cellular network to the 802.1x network occurs or, if the call is currently being handled by the 802.1x network, the connection with the 802.1x network would continue to be maintained. As another alternative, the selector switch could have multiple states so that selection of one sate would cause the value of X to increase whereas selection of another state would cause the value of X to decrease. Alternatively, multiple selector switches could be provided. It should be noted that the method shown in FIG. 6 is only one of a variety of methods that could be used to accomplish the objectives of determining when a handoff is to occur, handing the call off when a determination has been made that a handoff should occur, and/or overriding the handoff.

It should be noted that although the present invention has been described with reference to particular embodiments, the present invention is not limited to the embodiments described herein. Modifications can be made to the embodiments described herein and all such modifications are within the scope of the invention.

What is claimed is:

1. A call control server comprising:
   a processor; and
   a memory that stores computer-executable instructions that, when executed by the processor, cause the processor to perform operations comprising
   receiving, from a wireless device in communication with the call control server over an 802.1x network,
   a first signal strength of a first connection over the 802.1x network,
   a second signal strength of a second connection over a cellular network, and
   a selection of an amount,
   determining that the second signal strength exceeds a threshold signal strength comprising a sum of the first signal strength and the amount, and
   causing a media gateway to switch the wireless device from the first connection to the second connection.

2. The call control server of claim 1, wherein the amount is adjusted manually using a selector switch onboard the wireless device, and wherein the selector switch has multiple states to manually increase or decrease the amount.

3. The call control server of claim 1, further comprising a serving GPRS support node that connects the cellular network to the media gateway.

4. The call control server of claim 1, further comprising an access point that connects the 802.1x network to the media gateway.

5. The call control server of claim 1, further comprising a local exchange carrier switch that connects the media gateway to a plain old telephone service network.

6. The call control server of claim 5, wherein the operations further comprise receiving an address of a terminating station from the wireless device.

7. A call control server comprising:
   a processor; and
   a memory that stores computer-executable instructions that, when executed by the processor, cause the processor to perform operations comprising
   receiving, from a wireless device in communication with the call control server over a cellular network,
   a first signal strength of a first connection over the cellular network,
   a second signal strength of a second connection over an 802.1x network, and
   a selection of an amount,
   determining that the second signal strength exceeds a threshold signal strength comprising a sum of the first signal strength and the amount, and
   causing a media gateway to switch the wireless device from the first connection to the second connection.

8. The call control server of claim 7, wherein the amount is adjusted manually using a selector switch onboard the wireless device, and wherein the selector switch has multiple states to manually increase or decrease the amount.

9. The call control server of claim 7, further comprising a serving GPRS support node that connects the cellular network to the media gateway.

10. The call control server of claim 7, further comprising an access point that connects the 802.1x network to the media gateway.

11. The call control server of claim 7, further comprising a local exchange carrier switch that connects the media gateway to a plain old telephone service network.

12. The call control server of claim 11, wherein the operations further comprise receiving an address of a terminating station from the wireless device.

13. A method comprising:

receiving, by a call control server comprising a processor, a first signal strength of a first connection of a wireless device over a cellular network, a second signal strength of a second connection of the wireless device over an 802.1x network, and a selection of an amount from the wireless device over the 802.1x network;

determining, by the processor, that the first signal strength exceeds a threshold signal level comprising a sum of the second signal strength and the amount; and causing, by the processor, a media gateway to switch the wireless device from the 802.1x network to the cellular network.

14. The method of claim 13, wherein the amount is adjusted using a selector switch on the wireless device, and wherein the selector switch has multiple states to manually increase or decrease the amount.

15. The method of claim 14, wherein activation of the selector switch increases the amount to prevent a handoff between the 802.1x connection and the cellular connection.

16. The method of claim 13, further comprising causing the media gateway to switch the wireless device from the cellular network if the 802.1x signal level exceeds the cellular signal level by the amount.

17. The method of claim 13, further comprising determining that a call session is active prior to the switching.

18. The method of claim 13, further comprising receiving a selection of one of an increased amount and a decreased amount from the wireless device.

19. The method of claim 18, further comprising maintaining the 802.1x connection upon receiving the selection of the decreased amount.

20. The method of claim 13, further comprising receiving a selection indicating an override request from the wireless device.

* * * * *